`3,350,332`
RIGID POLYVINYL CHLORIDE BLENDS HAVING IMPROVED IMPACT STRENGTH

Edgar E. Hardy, Longmeadow, and Ludwig A. Beer, Agawam, Mass., assignors to Monsanto Company, a corporation of Delaware
No Drawing. Filed Oct. 5, 1962, Ser. No. 228,735
7 Claims. (Cl. 260—22)

This invention relates to polyblends, and more particularly to blends of vinyl chloride polymers, an isocyanate-terminated polyester prepolymer and a difunctional component.

In order to improve the physical and thermal properties of unplasticized vinyl chloride polymers, they are generally blended with rubbery elastomeric materials such as butadiene/acrylonitrile rubbers, butadiene/fumarate copolymers, ethylene/vinyl acetate copolymers, chlorinated polyethylene and the like. Unfortunately, due to the unsaturated nature of the rubbery components, the physical blends tend to be sensitive to oxidation during processing and uilization. On the other hand, physical blends of unplasticized vinyl chloride polymers with saturated elastomeric materials tend to be detrimentally sensitive to mineral oils and hydrocarbon solvents due to the hydrocarbon structure of the saturated elastomeric component.

It was found that polyester unrethanes, as the elastomeric component of polyvinyl chloride polyblends, contribute the necessary physical and thermal properties without the undesirable effects of oxidation and sensitivity to mineral oils and hydrocarbon solvents. However, the solid polyester urethane elastomers are produced with some difficulty and at high costs, thereby restricting commercial use. Of more importance, the blending of polyester urethanes with polyvinyl chloride is less than satisfactory in terms of the milling requirements, homogeneity of the final product and degradation of product components.

Accordingly, it is an object of this invention to provide vinyl chloride polymer blends having improved physical and rheological properties.

Another object of this invention is to provide an improved process for preparing vinyl chloride polymer blends having improved physical and rheoligical properties, which process can be carried out in conventional milling equipment.

These and other objects are attained by initimately mixing 60–93 parts by weight of a vinyl chloride polymer at temperatures above the fusion point of said polymer with 40–7 parts by weight total of two other components comprising (1) an isocyanate-terminated polyester prepolymer and (2) a difunctional organic compound selected from the group consisting of diols, diamines, aminoalcohols and mixtures of the same. Tall oil may be used in partial substitution for the prepolymer and the difunctional organic compound.

The following examples are given to illustrate the invention and are not intended as a limitation thereof, and unless otherwise specified, quantities are mentioned on a weight basis.

Example I

One hundred parts of polyvinyl chloride are milled to a fused, coherent state on a roll mill, having approximately ⅛-inch clearance between the rolls, at about 175° C. in admixture with 2 parts of tin mercaptide as a stabilizer and 0.5 par of stearic acid as a lubricant.

During milling and after the polyvinyl chloride has reached the fused coherent state, 11.5 parts of a mixture of (1) 100 parts of an isocyanate-terminated polyester prepolymer prepared by reacting 11 mols of ethylene glycol and 10 mols of adipic acid with sufficient 4,4′-diphenylmethane diisocyanate to produce a prepolymer having about 6.3 to 6.7% isocyanate radical content and (2) 7.0 parts of anhydrous 1,4-butanediol is vigorously stirred for 1 minute at 75° C., and gradually added to the polyvinyl chloride resin over a period of about 10 minutes while the polyvinyl chloride resin is being milled. Milling is continued thereafter at 175° C. for approximately 25 minutes to form an intimate mixture of the polymers. During the 25-minute milling period, stock samples are taken after 5, 15, and 25 minutes of milling.

Two sets of test specimens are formed from the resulting stock samples. The first set comprises ⅛-inch mill strips taken directly from the mill rolls, hereinafter referred to as "milled" samples, while the second set comprises test specimens formed from samples taken from the mill rolls which have been compression-molded at 185° C. under a pressure of aproximately 5000 p.s.i. to form smooth-surfaced flat slabs, hereinafter referred to as "molded" samples. The milled and molded samples are found to have the following properties:

Properties

Impact strength, ft. lbs./in. of notch:
  5-min. molded sample _____ 19.5
  5-min. milled sample _____ 14.8
  15-min. milled sample _____ 21.8
  25-min. milled sample _____ 23.5
  25-min. molded sample _____ 24.2

Heat distortion, ° C., 10-mil deflection, at 264 p.s.i.,
  25-min. molded sample _____ 69.8

Short "D" hardness, 25-min. molded sample _____ 75

Yield values:
  25-min. molded samples tensile strength,
    p.s.i. _____ 6060
  Percent elongation _____ 4.5
  Modulus, p.s.i.$\times 10^5$ _____ 2.6

The above blends which are designed for calendering and extrusion exhibit good thermal flow and mechanical properties when processed at 175° C. on the mill rolls.

In the above example, impact strength determinations are run on milled samples as well as molded samples. As some blends may have good impact strength in pressed moldings and not in the milled sheets, both types of samples are tested. A blend not developing good impact on the mill, although showing excellent impact properties on press-molded material, would not be expected to produce good impact material on extrusion or injection-molding. Also, impact strength versus milling time is a good indicator of the stability of a particular blend. Miller samples, taken after 5, 15, and 25-minute milling, show that impact strength develops quickly and remains substantially constant during prolonged milling for all levels.

Example II

A second series of tests are run in the same manner as in Example I except that the prepolymer is an isocyanate-terminated polyether prepared by reacting a mixture of 47 parts of polypropylene glycol (molecular weight about 2000) and 31 parts of a polyether triol (molecular weight about 3000) obtained from glycerine and propylene oxide, with 23 parts of 2,4-tolylene diisocyanate. In all cases, the blends appear "cheesy" on the rolls and have no hot tear strength. Notched impact strengths run on compression molded samples are poor ranging in most instances below 2 ft. lbs. As contrasted with the blends prepared using polyester prepolymers, the blends utilizing the polyether prepolymers exhibit a high level of incompatibility with vinyl chloride polymers.

Example III

In successive runs, seven blends, each containing 90 parts of polyvinyl chloride, in admixture with 2 parts of tin mercaptide as a stabilizer and 0.5 part of stearic acid as a lubricant, are milled to a fused, coherent state on a roll mill, having approximately ⅛-inch clearance between the rolls, at about 175° C.

To each run of polyvinyl chloride resin prepared in the above manner is added 10 parts of one of the individual mixtures indicated below while maintaining continuous milling. Each such mixture contains varying amounts of the isocyanate-terminated polyester prepolymer prepared as in Example I, anhydrous 1,4-butanediol and tall oil and is vigorously stirred for 1 minute at 75° C. before addition to the polyvinyl chloride.

MIXTURES.—PROPORTIONS IN PARTS BY WEIGHT

| Mixture No. | Polyester | Butanediol | Tall Oil |
|---|---|---|---|
| 1 | 100 | 7 | 0 |
| 2 | 100 | 7 | 10 |
| 3 | 100 | 7 | 20 |
| 4 | 100 | 7 | 30 |
| 5 | 100 | 7 | 40 |
| 6 | 100 | 7 | 50 |

Milling is continued thereafter at 175° C. for approximately 25 minutes to form an intimate mixture of the components. Stock samples are taken after 5 minutes milling.

Izod impact strength of mill strips after 5 minutes of milling are as follows:

| Blend No | 1 | 2 | 3 | 4 | 5 | 6 |
|---|---|---|---|---|---|---|
| Impact Strength, ft. lbs./in. of notch | 22.7 | 21.3 | 18.6 | 19.0 | 15.8 | 4.0 |
| Heat Distortion Temp., ° C., 10-mil defl. at 264 p.s.i | 63.7 | 64.4 | 65.3 | 63.0 | 64.4 | |

As shown by the data, elastomers extended with high levels of cheap tall oil still yield good quality polyblends which means a sizable reduction in urethane cost. Impact strength is essentially retained in the samples containing up to 40 parts of tall oil per 100 parts of the isocyanate-terminated polyester prepolymer (Samples 1–5).

In the process for preparing the featured blends such as described in Example I, the vinyl chloride polymer is first milled to a fused coherent state generally in the presence of a stabilizer and a lubricant before the gradual addition of the mixture comprising the prepolymer, the difunctional compound and tall oil. However, it is also possible and sometimes desirable to add the individual components of the mixture individually. For example, the difunctional compound could be added before or after fusion of the vinyl chloride polymer and thoroughly admixed before the addition of the prepolymer and tall oil. In any of the above methods the vinyl chloride polymer must eventually be brought to fusion temperature to ensure homogeneity of the final mix preferably before the prepolymer and tall oil are added. The fusion temperature of the vinyl chloride polymer will, of course, depend on its average molecular weights but, in general, temperatures above 150° C. are sufficient for both fusion and optimum mixing. It is also preferable to maintain the temperature below 200° C. to minimize blend degradation.

The vinyl chloride polymers which are used in the practice of the invention are polymers consisting of 85–100% by weight of combined vinyl chloride and up to 15% by weight of one or more combined copolymerizable monomers, e.g., vinyl acetate, vinylidene chloride, acrylonitrile, diethyl maleate, dibutyl maleate, diethyl fumarate, acrylate and methacrylate esters such as methyl acrylate, ethyl acrylate, methyl methacrylate, butyl methacrylate, etc. The invention is particularly applicable to the modification of vinyl chloride polymers having number average molecular weights of 30,000 to 150,000 and more preferably to number average molecular weights in the range of 30,000 to 75,000.

The isocyanate-terminated polyester prepolymers used in the practice of this invention are generally prepared by reacting linear or substantially linear polyesters with an excess of an organic diisocyanate compound. Particularly suitable prepolymers are those based on polyesters prepared from glycols such as ethylene glycol and aliphatic polymethylene dicarboxylic acids such as adipic acid with the percent hydroxyl groups ranging between 0.6 and 2.4%. The quantity of the organic diisocyanate utilized should be in excess and sufficient to produce a prepolymer having about 6.3 to 6.7% isocyanate radical content. Furthermore, in order to properly blend the polyester with the vinyl chloride polymer, the preparation of the isocyanate-terminated polyester prepolymer must result in a product that is liquid or at least semi-liquid at the blending temperatures. Consequently, the weight average molecular weight of the polyester prepolymer should be below 5000 and more preferably below 3000. As mentioned above, the linear or substantially linear polyesters are preferably prepared by the condensation of one or more dihydric alcohols with one or more aliphatic dibasic carboxylic acids. If desired, non-cyclic forming hydroxy carboxylic acids may be condensed to form the polyester. As dihydric alcohols there may be mentioned ethylene glycol, 1,2-propylene glycol, 1,3-butylene glycol, 1,4-butanediol, 1,6-hexanediol, methyl hexane 1,6-diol, 1,4-butenediol, diethylene glycol, thiodiglycol, 2,2-dimethyl-1,3-propylene glycol, and the like. As aliphatic acids there may be mentioned malonic, succinic, adipic, methyladipic, maleic, dihydromuconic, sebacic, suberic, and the like. The diisocyanate compounds that may be used in preparation of the isocyanate-terminated polyester prepolymers used in this invention have the general formula:

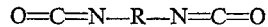

$$O=C=N-R-N=C=O$$

wherein R is independently selected from the group consisting of alkyl, arakyl, aryl and alkaryl radicals having from 2 to 14 carbon atoms. As examples of diisocyanates, there may be mentioned tetramethylene diisocyanate, pentamethylene diisocyanate, hexamethylene diisocyanate, decamethylene diisocyanate, thiodipropyl diisocyanate, p,p'-diphenyl methane diisocyanate, meta-xylylene diisocyanate, benzidine diisocyanate, phenylene diisocyanate, chlorophenylene diisocyanate, toluylene diisocyanate, naphthylene diisocyanate, and the like. A particularly preferred diisocyanate compound is 4,4'-diphenylmethane diisocyanate. As mentioned above, the isocyanate-terminated polyester prepolymer formed by the reaction of polyesters and diisocyanate compounds must be liquid or at the very least semi-liquid at blending temperatures. Consequently, the selection of the particular components and the extent of the reaction are controlled to limit the weight average molecular weight of the isocyanate-terminated polyester prepolymer.

The difunctional organic compounds used in the practice of this invention are selected from the group consisting of diols, diamines, amino-alcohols and mixtures of the same. The quantity of the difunctional compound used in the blending operation should be based on the available NCO groups in the prepolymer. For optimum results the ratio of NCO groups to functional group ((OH) and/or (NH$_2$)) should range between 1.01 and 1.2 and more preferably 1.01 and 1.15. The difunctional compound is preferably a diol and more preferably butanediol. However, other difunctional compounds may be used and examples of diols that may be used in the practice of the invention are ethylene glycol, 1,2-propylene glycol, 1,3-propylene glycol, 1,3-butylene glycol, 1,4-butylene glycol, 1,6-hexane diol, methyl hexane-1,6 diol, 1,4-butene diol, diethylene glycol, thiodiglycol, 2,2'- dimethyl-1,3-propylene glycol, and mixtures of the same. Examples of diamines that may be used in the practice of the invention are ethylene diamine, phenylene diamine, naphthylene diamine, piperazine, 1,4-butylene diamine. If desired, difunctional compounds containing both the hydroxyl and amino groups may be used. In addition, mixtures of these compounds may also be employed, e.g., a mixture of equal parts of 1,4-butylene glycol and 1,4-butylene diamine. Examples of aminoalcohols that may be used in the practice of the invention are amino-ethyl-alcohol, 2,2-dimethyl-propanol-amine, and the like. In general, difunctional compounds that may be used in this invention have the general formula:

R—A—R′ wherein A is independently selected from the group consisting of alkyl, aralkyl, aryl and alkaryl radicals, having from 2 to 14 carbon atoms, and R and R′ are independently selected as an amino or hydroxyl group.

A material that than can be used as a reactive diluent is tall oil. Tall oil is a by-product in the manufacture of kraft paper from pine or fir wood and is generally considered to be a mixture of fatty acids, rosin acids, and unsaponifiable materials. Tall oil is preferred in the present invention as a substitutional component since part of the properties contributed by this component are due to the esterification of substantial amounts of rosin acids. However, the quantity of tall oil used should not exceed about 55 percent or more preferably 50 percent of the total weight of the prepolymer and the difunctional organic compound or else the blend will tend to be cheesy and exude unreacted tall oil.

The polymer mixtures of the invention are generally prepared by intimately mixing isocyanate-terminated prepolymers and difunctional organic compounds with the fused, coherent vinyl chloride polymer at elevated temperatures of about 150 to 200° C. and most probably 160–180° C. depending to a large extent on the average molecular weight or composition of the vinyl chloride polymer. Ordinarily, this intimate mixture is accomplished by mixing the polymers in a machine of the type normally used for mixing rubbers and plastics, e.g., a roll mill or Banbury mixer.

Before the vinyl chloride polymer is fused, a heat stabilizer is preferably incorporated with the vinyl chloride polymer to minimize thermal degradation. Suitable stabilizers are those normally used to stabilize vinyl chloride polymers against thermal degradation, e.g., anhydrous tribasic lead sulfate, tin mercaptide, barium-cadmium complexes, etc.

Optional additives, such as stabilizers, fillers, colorants, processing aids, lubricants, co-plasticizers, etc., can be incorporated into blends if desired. Among the processing aids and co-plasticizers suitable for incorporation into the polyblends are, e.g., styrene-acrylonitrile copolymers, styrene-methyl methacrylate copolymers, epoxy compounds, etc.

The products of the invention are rigid or semi-rigid compositions which are useful in preparing sheets, tubes, and molded objects having high impact strength. In addition, these compositions possess excellent water, oil, gasoline and detergent resistance making them particularly desirable for applications in bottles and other packaging systems. They are also characterized by good flow properties at relatively low processing temperatures, high heat distortion point, good chemical resistance, and good tensile strength. Examination of samples of the compositions withdrawn from a roll mill after milling times of 5, 15, and 25 minutes, shows that they can withstand relatively long milling times without undergoing thermal degradation. They may be calendered, injection-molded, extruded, or otherwise fabricated, usually at temperatures of about 150–200° C., to form rigid sheets, pipes, structural pieces, wire coatings, etc. When desirable, they can be reinforced, e.g., with asbestos fibers.

It is obvious that many variations may be made in the products and processes set forth above without departing from the spirit and scope of this invention.

What is claimed is:

1. A fused blend prepared by intimately mixing 60 to 93 parts by weight of vinyl chloride polymer containing at least 85 percent by weight of vinyl chloride at temperatures above the fusion point of said polymer with 40–7 parts by weight total of other components comprising (1) an isocyanate-terminated polyester prepolymer which is prepared by reacting substantially linear polyesters with an excess of diisocyanate compound having the general formula:

$$O=C=N-R-N=C=O$$

wherein R is independently selected from the group consisting of alkyl, aralkyl, aryl and alkaryl radicals having from 2 to 14 carbon atoms, said isocyanate-terminated polyester prepolymer having a weight average molecular weight below 5,000, (2) a difunctional organic compound selected from the group consisting of diols, diamines, amino-alcohols and mixtures of the same and (3) tall oil in an amount up to 50 parts by weight per 100 parts of the total weight of the isocyanate-terminated polyester prepolymer and the difunctional organic compound.

2. A process for preparing vinyl chloride polymer compositions which comprises intimately mixing 60–93 parts by weight of a vinyl chloride polymer containing at least 85 percent by weight of vinyl chloride at temperatures above the fusion point of said polymer with 40–7 parts by weight total of other components comprising (1) an isocyanate-terminated polyester prepolymer which is prepared by reacting substantially linear polyesters with an excess of diisocyanate compound having the general formula:

$$O=C=N-R-N=C=O$$

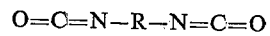

wherein R is independently selected from the group consisting of alkyl, aralkyl, aryl and alkaryl radicals having from 2 to 14 carbon atoms, said isocyanate-terminated polyester prepolymer having a weight average molecular weight below 5,000, (2) a difunctional organic compound selected from the group consisting of diols, diamines, amino-alcohols and mixtures of the same and (3) up to 50 parts by weight of tall oil per 100 parts of the total weight of the isocyanate-terminated polyester prepolymer and the difunctional organic compound.

3. The process of claim 2 wherein the substantially linear polyester is prepared by the condensation of glycols and aliphatic polymethylene dicarboxylic acids.

4. The process of claim 3 wherein the glycol is ethylene glycol and the aliphatic polymethylene dicarboxylic acid is adipic acid.

5. The process of claim 4 wherein the diisocyanate compound is 4,4′-diphenylmethane diisocyanate.

6. The process of claim 5 wherein the difunctional organic compound is butanediol.

7. A process for preparing vinyl chloride polymer compositions which process comprises prefusing on a mill, at temperatures between 150–200° C., 60 to 93 parts by weight of vinyl chloride polymer containing at least 85 percent by weight of vinyl chloride and gradually adding to said prefused polymer while maintaining continuous milling 40–7 parts by weight total of other components comprising (1) an isocyanate-terminated polyester prepolymer which is prepared by reacting substantially linear polyesters with an excess of diisocyanate compound having the general formula:

$$O=C=N-R-N=C=O$$

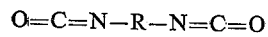

wherein R is independently selected from the group consisting of alkyl, aralkyl, aryl and alkaryl radicals having from 2 to 14 carbon atoms, said isocyanate-terminated polyester prepolymer having a weight average molecular weight below 5,000, (2) a difunctional organic compound selected from the group consisting of diols, diamines, amino-alcohols and mixtures of the same and (3) up to 50 parts by weight of tall oil per 100 parts of the total weight of the isocyanate-terminated polyester prepolymer and the difunctional organic compound.

References Cited

UNITED STATES PATENTS

| | | | |
|---|---|---|---|
| 2,851,436 | 9/1958 | Forsythe | 260—45.4 |
| 2,872,430 | 2/1959 | Parker et al. | 260—45.4 |
| 2,987,504 | 6/1961 | Wagner | 260—45.4 |
| 3,257,261 | 6/1966 | Hochberg | 260—23 |

FOREIGN PATENTS

| | | |
|---|---|---|
| 226,298 | 1/1960 | Australia. |
| 1,108,785 | 1/1956 | France. |
| 638,118 | 5/1950 | Great Britain. |
| 830,226 | 3/1960 | Great Britain. |
| 884,153 | 12/1961 | Great Britain. |

DONALD E. CZAJA, *Primary Examiner.*

JAMES A. SEIDLECK, LEON J. BERCOVITZ,
*Examiners.*

JOSEPH L. SCHOFER, R. W. GRIFFIN,
*Assistant Examiners.*